United States Patent [19]
Ling et al.

[11] 3,741,655
[45] June 26, 1973

[54] MEANS FOR DETERMINING THE EXISTENCE OF AN OBJECT WITHIN A PREDETERMINED RANGE INTERVAL

[75] Inventors: Bernt Ling; Anders Persson, both of Vasteras, Sweden

[73] Assignee: Allmanna Svenska Elektriska Aktiebolaget, Vasteras, Sweden

[22] Filed: Dec. 9, 1971

[21] Appl. No.: 206,277

[30] Foreign Application Priority Data
Dec. 11, 1970 Sweden.......................16782/70

[52] U.S. Cl...................... 356/5, 343/17.1, 325/323
[51] Int. Cl................................................ G01c 3/08
[58] Field of Search ..................... 356/4, 5; 343/12, 343/17.1, 7.7; 325/323, 473

[56] References Cited
UNITED STATES PATENTS
3,650,628 3/1972 Tawfik et al............................ 356/4
3,623,095 11/1971 Gerardin............................... 343/7.7

Primary Examiner—Benjamin A. Borchelt
Assistant Examiner—S. C. Buczinski
Attorney—Jennings Bailey, Jr.

[57] ABSTRACT

A signal-detector which detects whether or not an object exists at a predetermined distance comprises a detector unit and an evaluation device which operates with a first and second group of one or more time gaps, in which the first group comprises a first time gap arranged to coincide with the duration of at least a part of an expected and known signal and the second group of time gaps comprises a second time gap spaced from said first time gap and the magnitudes corresponding to the signals obtained during the time gaps are arranged to be compared in the evaluating device whereby an output signal from said device gives information as to whether an object exists or not.

2 Claims, 3 Drawing Figures

MEANS FOR DETERMINING THE EXISTENCE OF AN OBJECT WITHIN A PREDETERMINED RANGE INTERVAL

BACKGROUND OF THE INVENTION

1. Field of the Invention

The invention relates to a device intended for use in determining whether an object exists at a predetermined distance by detecting signals occurring together with noise of approximately the same magnitude, the signal being a repeated process and the signals being of known and/or calculated duration. The device operates with a first and a second group of one or more time gaps and comprises a detector unit and an evaluating device.

2. The Prior Art

The problem is to determine in a simple manner whether a signal exists or not. There are known devices which operate using only one time gap having a pre-set constant level of noise of expected amplitude, said time gap occurring at the moment when a signal is expected a signal being indicated if it occurs during said time gap and has an amplitude exceeding the level of said pre-set noise. The indication is thus entirely dependent on the noise level set, and a continually varying noise level caused by alteration in the weather, for example, cannot be taken into account.

SUMMARY OF THE INVENTION

The invention includes a signal-detector which detects whether or not an object exists at a predetermined distance comprising a detector unit and an evaluation device which operates with a first and second group of one or more time gaps, in which the first group comprises a first time gap arranged to coincide with the duration of at least a part of an expected and known signal and the second group of time gaps comprises a second time gap spaced from said first time gap and the magnitudes corresponding to the signals obtained during the time gaps are arranged to be compared in the evaluating device whereby an output signal from said device gives information as to whether an object exists or not.

The object of the present invention is to provide a device with the help of which such a signal detection can be carried out taking into consideration a varying noise level.

BRIEF DESCRIPTION OF THE DRAWINGS

The invention will be further described with reference to the accompanying drawings in which.

DESCRIPTION OF THE PREFERRED EMBODIMENTS

Figure 1:
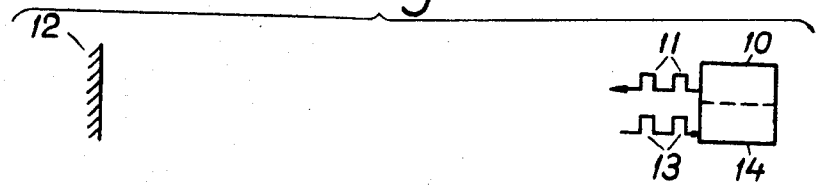
FIG. 1 shows a measuring process.
Figure 2:
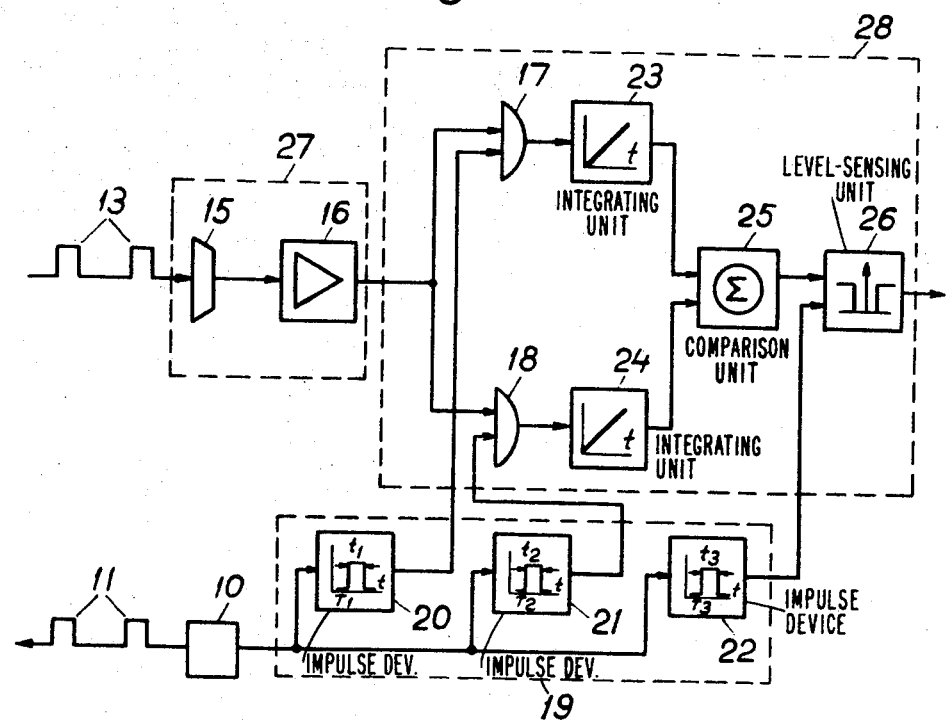
FIG. 2 shows an embodiment of the device according to the invention.

In FIG. 1, an emitter unit 10 emits a number of known pulses 11 which are arranged to reach a target 12 at a known distance. Pulses 13 reflected from the target 12 are supplied to a receiver unit 14. The emitter unit 10 and the receiver unit 14 are constructed as shown in FIG. 2.

The reflected pulses 13 are supplied to a detector 15, the output signal of which is amplified by an amplifier 16 and then supplied to two separate gates 17 and 18. These gates 17 and 18 are controlled in time by means of a control unit 19 connected to the emitter 10 and comprising three inpulse devices 20, 21 and 22 operating the time delays $T_1$, $T_2$ and $T_3$, respectively and impulse lengths $t_1$, $t_2$ and $t_3$, respectively, where $T_1$, $T_2$, $T_3$ are the times on which impulses of the lengths $t_1$, $t_2$ and $t_3$ are transmitted to the gates 17 and 18 and a level sensing unit 26, respectively; the times $T_1$, $T_2$, $T_3$ being measured from the moment when a pulse 11 has been emitted from the emitter 10. The emitter 10 is connected over the impulse devices 20 and 21 to the gates 17 and 18, respectively. The time delay $T_1$ of the impulse device is of such duration that the gate 17 is only open when the reflected pulses 13 or parts of them are expected and the time delay $T_2$ of the impulse device 21 is of such duration that the gate 18 is open at a moment when the gate 17 is not open, suitably a certain time prior to this, that is $T_2 = t_2 < T_1$ and of substantially the same duration, that is $t_2 \approx t_1$. This means that the gate 18 is opened a certain time $T_2$ after the pulses 11 have been emitted and remains open for the duration of $t_2$. Thus only noise signals are received and supplied to an integrating unit 24, the in-coming noise signals being integrated during the time $t_2$. At the time $T_1 > T_2 + t_2$ after the pulses 11 have been emitted, the gate 17 is opened for a time $t_1$, whereupon the expected signal or a part of it is received together with said noise signal and supplied to an integrating unit 23 where it is integrated for a time $t_1$. The contents of the two integrating units 23 and 24 are supplied to a comparison unit 25 which is arranged to compare the contents of the two integrators by producing, for example a ratio or a difference between the signals coming in to the unit 25. Let us now assume that the unit 25 produces a difference so that an output signal is obtained from the unit 25 as soon as there is a difference between the incoming signals. The output signal from the unit 25 is supplied to a level-sensing unit 26. The connection between the units 25 and 26 is controlled by means of the impulse device 22 included in the control unit 19. The level-sensing unit 26 is connected after a suitable period $T_3 >> T_1 + T_2$, that is, after a substantial number of measurements have been performed. If a pre-set level for the unit 26 is exceeded as a result of the contents of the signal from the unit 25, a signal has been obtained. The output signal from the level-sensing unit 26 can be connected to a suitable indicating device.

Figure 3:
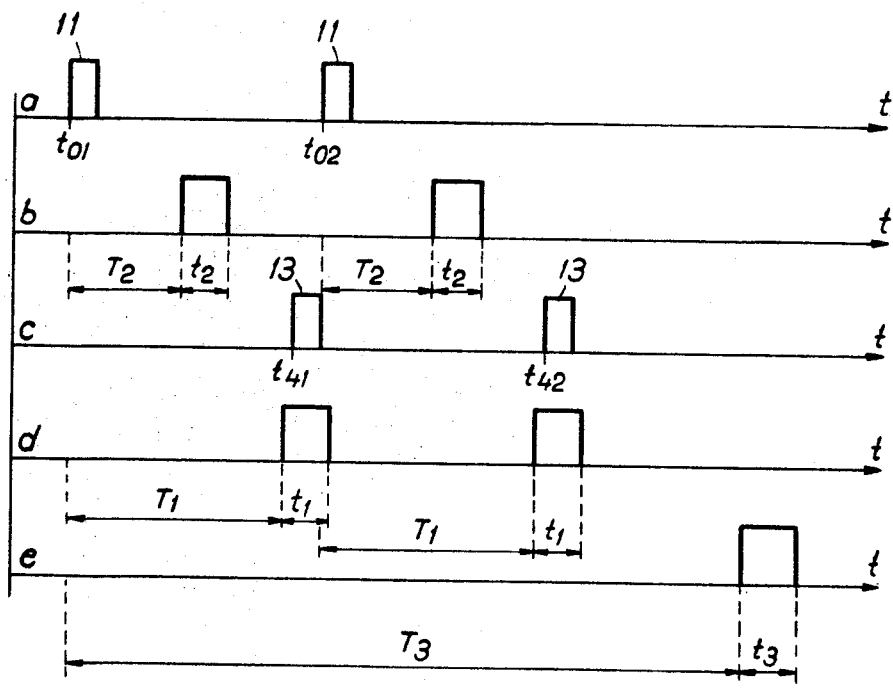
FIG. 3 is an explanatory diagram.

FIG. 3 shows relation one possible between the times mentioned above. The time axis $a$ shows pulses 11 emitted from the emitter unit 10 at the times $t_{o1}$ and $t_{o2}$. Time axis $b$ shows that gate 18 is opened at the times $(t_{o1} + T_2)$, respectively, for a duration of $t_2$. The time axis $c$ shows the intervals beginning at $t_{41}$, and $t_{42}$, each representing the predetermined range interval at two separate measurements. The time axis $d$ shows that gate 17 is opened at the times $(t_{o1} + T_1)$ and $(t_{o2} + T_1)$, respectively, with a duration of $t_1$. $t_1$ and $t_2$ may here be longer or shorter than the length of the pulse expected.

The criterion is that at least a part of the duration $t_1$ coincides with the length of the pulse expected. Time axis $e$ shows that when a number of expected-signal-occasions (here: two) have passed, an impulse at the time $t_{o1} + T_3$ is passed to the level-sensing unit 26.

The device according to the invention is suitable for determining distance since, by successively shifting the time gaps, a greater range can be scanned. The integrating units should be zeroised between each shift in the time gaps.

This latter measuring process can be used with advantage for determining cloud altitude, for example, in which case the emitter suitabley comprises a laser.

We claim:

1. Means for determining the existence of an object within a predetermined range interval, said means including:

a signal transmitting means for transmitting signal pulses, a detecting means for receiving echo signal pulses originating from said transmitted signal pulses, first and second evaluating means connectable to said detecting means for evaluating the power of the incident signal pulses, control devices for connecting said first evaluating means to said detecting means during a first time interval and for connecting said second evaluating means to said detecting means during a second time interval, comparing means connected to said first and second evaluating means to determine the difference between the power of the signal pulses evaluated by the first evaluating means and the power of the signal pulses evaluated by the second evaluating means, a level-sensing means connectable to said comparing means, said first time interval wholly or partly coinciding with said range interval and said second time interval being separated from said first time interval, and the first and second time intervals being close to each other and substantially of the same length, a control device connecting said comparing means to said level-sensing means after transmission of a substantial number of signal pulses by said transmitting means when echo signal pulses originating from said transmitted signal pulses should have reached said reciever if there is an object in said pre-determined range, said level-sensing means, if the contents of said comparing means exceeds a pre-determined level, generating an output signal, and such output signal indicating the existence of an object in said pre-determined range interval.

2. Means for determining the existence of an object within a predetermined range interval, said means including:

a signal transmitting means for transmitting signal pulses, a detecting means for receiving echo signal pulses originating from said transmitted signal pulses, first and second evaluating means connectable to said detecting means for evaluating the power of the incident signal pulses, control devices for connecting said first evaluating means to said detecting means during a first time interval and for connecting said second evaluating means to said detecting means during a second time interval, comparing means connected to said first and second evaluating means to determine the ratio between the power of the signal pulses evaluated by the first evaluating means and the power of the signal pulses evaluated by the second evaluating means, a level-sensing means connectable to said comparing means, said first time interval wholly or partly coinciding with said range interval and said second time interval being separated from said first time interval, and the first and second time intervals being close to each other and substantially of the same length, a control device connecting said comparing means to said level-sensing means after transmission of a substantial number of signal pulses by said transmitting means when echo signal pulses originating from said transmittal signal pulses should have reached said reciever if there is an object in said pre-determined range, said level-sensing means, if the contents of said comparing means exceeds a pre-determined level, generating an output signal, and such output signal indicating the existence of an object in said pre-determined range interval.

* * * * *